(12) United States Patent
Subratie

(10) Patent No.: US 11,747,615 B2
(45) Date of Patent: Sep. 5, 2023

(54) OPTICAL COMPONENT PROTECTOR

(71) Applicant: Andrew Subratie, Surrey (GB)

(72) Inventor: Andrew Subratie, Surrey (GB)

( * ) Notice: Subject to any disclaimer, the term of this patent is extended or adjusted under 35 U.S.C. 154(b) by 0 days.

(21) Appl. No.: 18/116,223

(22) Filed: Mar. 1, 2023

(65) Prior Publication Data

US 2023/0204946 A1 Jun. 29, 2023

Related U.S. Application Data

(63) Continuation of application No. 17/057,911, filed as application No. PCT/GB2019/051422 on May 23, 2019.

(30) Foreign Application Priority Data

May 23, 2018 (GB) ..................... 1808468

(51) Int. Cl.
| | | |
|---|---|---|
| *G02B 1/00* | (2006.01) | |
| *G02B 27/00* | (2006.01) | |
| *B08B 5/02* | (2006.01) | |
| *B08B 13/00* | (2006.01) | |
| *G03B 17/56* | (2021.01) | |

(52) U.S. Cl.
CPC ............ *G02B 27/0006* (2013.01); *B08B 5/02* (2013.01); *B08B 13/00* (2013.01); *G03B 17/56* (2013.01); *B08B 2205/005* (2013.01)

(58) Field of Classification Search
CPC ....... G02B 27/0006; B08B 5/02; B08B 13/00; B08B 2205/005; G03B 17/56
See application file for complete search history.

(56) References Cited

U.S. PATENT DOCUMENTS

| | | | |
|---|---|---|---|
| 2003/0142403 A1 | 7/2003 | Kalley et al. | |
| 2003/0197909 A1 | 10/2003 | Beyer et al. | |
| 2006/0280608 A1* | 12/2006 | McCallum ............ | F04D 29/364 |
| | | | 416/112 |
| 2010/0024887 A1 | 2/2010 | Williams et al. | |
| 2014/0259320 A1* | 9/2014 | Gonzalez ................ | A61F 9/028 |
| | | | 2/424 |
| 2014/0261568 A1 | 9/2014 | Delgado et al. | |
| 2016/0237283 A1* | 8/2016 | Koene ...................... | C09D 7/62 |

FOREIGN PATENT DOCUMENTS

| | | |
|---|---|---|
| JP | 2001091807 A | 4/2001 |
| JP | 2014039179 A1 | 2/2014 |

OTHER PUBLICATIONS

UK Search Report of Application Serial No. GB1808468.1 dated Nov. 12, 2018, 2 pages.

(Continued)

*Primary Examiner* — Euncha P Cherry
(74) *Attorney, Agent, or Firm* — KOS IP Law LLP

(57) ABSTRACT

An optical component protector, comprising a transparent plate, configured to be mounted in front of an optical component to be protected and a plenum chamber, connected to a top edge of a transparent plate wherein the plenum chamber is configured to receive a supply of gas from a gas supply and provide a curtain of the gas across a surface of the transparent plate that is on an opposite side of the transparent plate from the optical component.

30 Claims, 2 Drawing Sheets

(56) References Cited

OTHER PUBLICATIONS

UK Examination Report under Section 10(3) of Application No. GB1808468.1 dated Nov. 17, 2020, 1 page.
International Search Report and Written Opinion of International Application No. PCT/GB2019/051422 dated Sep. 24, 2019, 9 pages.
International Preliminary Report on Patentability (Chapter 1) on corresponding PCT application (PCT/GB2019/051422) from International Searching Authority (EPO) dated Dec. 3, 2020, 7 pages.

* cited by examiner

OPTICAL COMPONENT PROTECTOR

CROSS-REFERENCE TO RELATED APPLICATION

This is a Continuation application of Ser. No. 17/057,911, filed Nov. 23, 2020, which is a national stage application of PCT/GB2019/051422, filed May 23, 2019, which claims priority to GB1808468.1, filed May 23, 2018, the contents of each of which are expressly incorporated herein by reference.

BACKGROUND

It has previously been known to prevent contaminants from reaching a lens by the provision of a transparent disk in front of the lens that it rotated at high speed. When such a disk is spun at a sufficiently fast speed, the likelihood of contaminants adhering to the surface of the disk is minimised. However, such an arrangement has a number of disadvantages. In order for the disk to be strong enough to rotate at the required speed, the mechanism may be heavy. It also typically generates a lot of noise and may introduce vibrations that can reduce the resolution of the image captured by the camera. The bearings supporting the spinning disk may also generate substantial heat. Furthermore, it should be appreciated that the speed of movement of the rotating disk is at a minimum in its centre, reducing the effectiveness of the system in this region.

SUMMARY

The present disclosure relates to a protector for an optical component. For example such a protector may be provided for use with a camera. When using a camera, it may be desirable to prevent contaminants from contacting the lens of the camera, which may affect the quality of the image. Such contaminants may include one or more of rain, dust and sand, depending on the environment in which the camera is to be used. An optical component protector configured to protect a camera lens may particularly be desirable for use with cameras being used to capture live video images, for example at sporting events, in which it may be undesirable to need to periodically clean the lens of the camera.

It would therefore be desirable to provide a system that reduces at least some of these disadvantages.

According to the present disclosure there is provided an optical component protector, comprising:
- a transparent plate, configured to be mounted in front of an optical component to be protected; and
- a plenum chamber, connected to a top edge of a transparent plate;
- wherein the plenum chamber is configured to receive a supply of gas from a gas supply and provide a curtain of the gas across a surface of the transparent plate that is on an opposite side of the transparent plate from the optical component.

Embodiments of the disclosure will be more clearly understood from the following description, given by way of example only, with reference to the accompanying drawings, in which:

DETAILED DESCRIPTION

Figure 1:
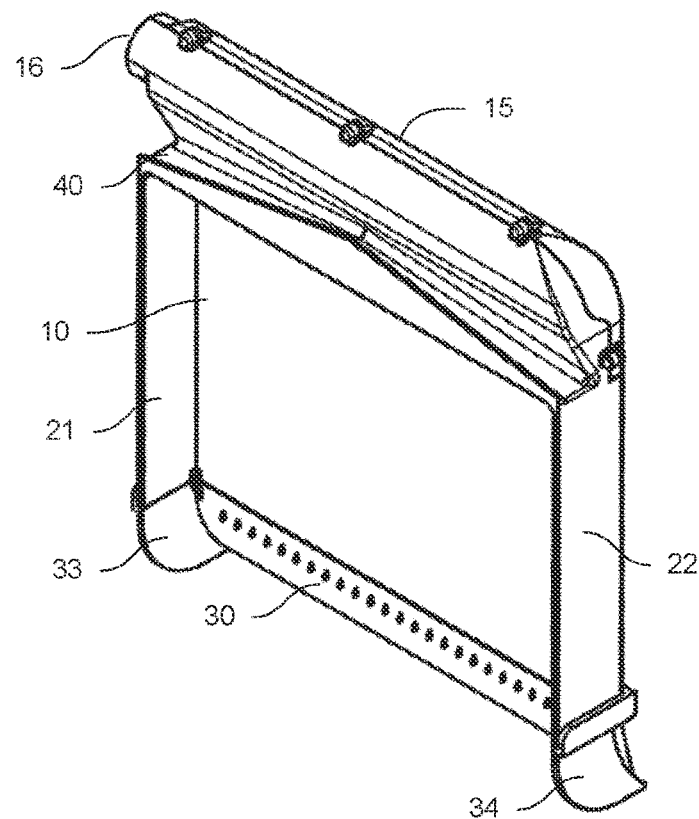
FIG. 1 schematically depicts a perspective view of a lens protector of the present disclosure.
Figure 2:
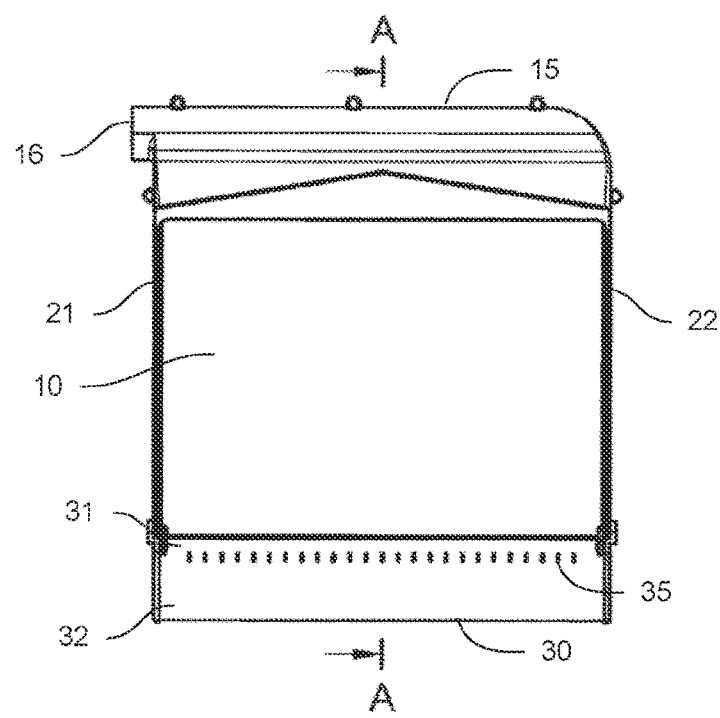
FIG. 2 depicts the lens protector shown in FIG. 1 from a side of the lens protector that is opposite to the side at which a lens protected by the lens protector would be located.

The following description relates to arrangements suitable for forming an optical component protector for use with lenses, namely a lens protector. Such a lens to be protected may be a camera lens. It should be appreciated, however that the arrangements may be used to provide an optical component protector for other lenses, including but not limited to lenses for telescopes and projectors. It should further be appreciated that the arrangements may also be used to protect other optical components, including but not limited to mirrors, prisms and transparent components such as windows, screens and windscreens.

As shown in the figures, a lens protector according to the present disclosure includes a transparent plate 10 that may be mounted as part of the lens protector in front of a lens to be protected. A lens to be protected by the lens protector, for example part of a camera, may be located on a first side of the transparent plate and a subject to be imaged by the camera may be located on a second side of the transparent plate 10, opposite to the first side.

As will be discussed further below, a plenum chamber 15 is connected to the top edge of the transparent plate 10. The plenum chamber 15 is arranged to receive a supply of air, for example from a fan, and expel the air as a curtain of air across the surface of the transparent plate. In an arrangement, the curtain of air may be provided on the second side of the transparent plate, namely on the opposite side of the transparent plate from the position of the lens to be protected.

The curtain of air may be configured such that any contaminants approaching the transparent plate, such a rain, dust and/or sand tend to become entrained in the flow of air and directed away from the transparent plate 10. Depending on the conditions of use, this may prevent any contaminants from contacting the surface of the transparent plate. Contaminants that do reach the surface of the transparent plate 10 may be removed from the surface of the transparent plate 10 by the curtain of air. In such an arrangement, damage to the transparent plate 10, such as scratching, caused by contact with the contaminants may be avoided or minimised. In contrast, in previously known apparatus, based on a spinning disk as described above, contact of the contaminants with the spinning disk is expected and may reduce the usable life of the spinning disk.

As shown, the plenum chamber 15 may include an inlet 16 configured to receive a supply of air, for example from a fan. It should be appreciated that the inlet 16 may be provided on any convenient location on the plenum chamber 15. The plenum chamber 15 includes a void 17 in which the air from the air supply may initially expand before being compressed into a small flow to provide the air curtain.

In order to form the air curtain, the plenum chamber 15 includes an elongate nozzle 18, or slot, adjacent to the surface of the transparent plate 10. In an arrangement, the nozzle 18 may converge towards the nozzle exit in order to compress the air.

The elongate nozzle 18 may be arranged such that the curtain of air exits the plenum chamber 15 adjacent to the transparent plate. The elongate nozzle 18 may also be configured such that the curtain of air exits the plenum chamber 15 in a direction parallel to the surface of the transparent plate 10 and away from the plenum chamber. In such an arrangement, the nozzle 18 may be configured such that the air curtain becomes attached to the transparent plate 10 by the coanda effect.

In an arrangement, one side of the nozzle 18 may be formed by the presence of the transparent plate 10. In such an arrangement, the manufacturing tolerance of the transparent plate 10 and of the other components of the lens protection to which it is mounted may significantly affect the width of the nozzle 18. In an arrangement one or more shims may be provided that can be used in assembly of the lens protector in order to mount the transparent plate such that its surface is positioned to provide a desired nozzle width.

In the arrangement shown and as discussed herein, a single air curtain is provided across the surface of the transparent plate 10. However, it should be appreciated that in some arrangements more than one air curtain may be provided. In such arrangements, a plurality of air curtains may be supplied from a common plenum chamber and/or plural plenum chambers may be provided.

As depicted in FIG. 1, in an arrangement, the plenum chamber 15 may be formed from two sections that are joined together to provide the void 17 within the plenum chamber 15. In an arrangement, the two sections of the plenum chamber 15 may be secured together by appropriate fixings, such as screws or bolts. An airtight gasket seal may be provided between the two sections. Other arrangements for providing the plenum chamber 15 may also be used.

Figure 3:
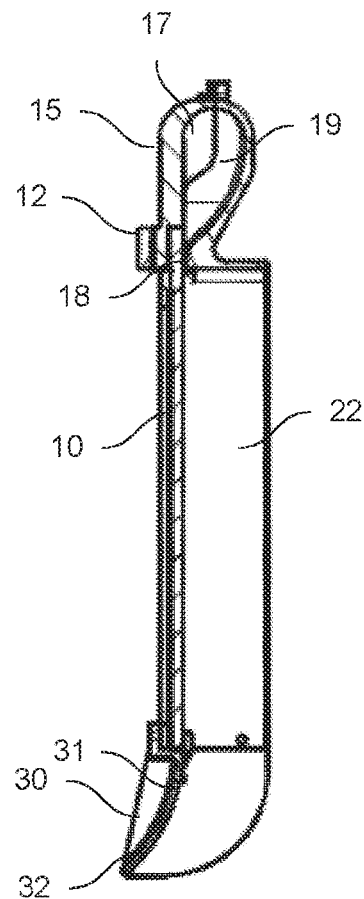
FIG. 3 depicts a cross section A-A through the lens protector as indicated in FIG. 2.
Figure 4:
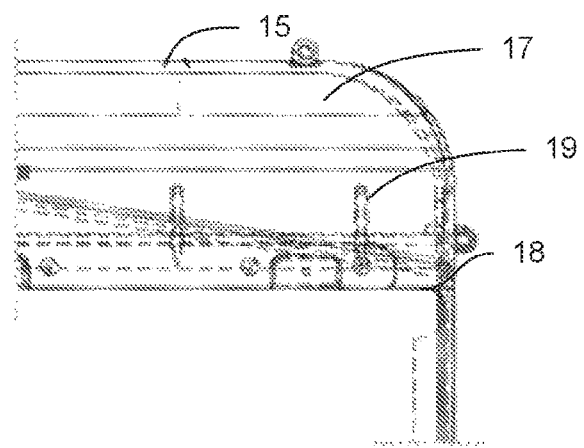
FIG. 4 schematically depicts a detail of the lens protector shown in FIGS. 1 to 3, including hidden details.

As shown in FIGS. 3 and 4, within the void 17 inside the plenum chamber 15 one or more guide vanes 19 may be provided. The guide vanes 19 within the plenum chamber 15 may assist in directing the air supplied into the plenum chamber 15 towards the nozzle 18 with a local air flow direction that is parallel to the direction of flow required within the air curtain. The guide vanes 19 within the plenum chamber 15 may be integrally formed with at least part of the plenum chamber 15. Alternatively, the guide vanes 19 may be formed separately and connected to the interior of the plenum chamber 15, for example with adhesive.

In an arrangement, the transparent plate 10 may be detachably attached to the plenum chamber 15. For example, a retaining clamp 12 may be provided for connecting the transparent plate 10 to the plenum chamber 15. Other arrangements for detachably attaching the transparent plate 10 to the plenum chamber 15 may also be used. Such an arrangement may permit replacement of the transparent plate 10, for example if it becomes damaged.

In an exemplary arrangement, the transparent plate may be approximately 150 mm wide across its top edge and approximately 100 mm long in the direction of the flow of the air curtain. For such an arrangement, with a sufficient airflow, an air curtain may be established by use of a nozzle 18 in the shape of a slot that is 0.3 mm wide. In such an arrangement, the air curtain expands along the length of the transparent plate 10 but, with a suitable air supply, may be approximately 2 cm thick at the bottom of the glass plate 10, which may be sufficiently effective to prevent an undesirable build-up of contaminants on the transparent plate 10.

It should be appreciated that different configurations of transparent plate 10 may be used and that, depending on the configuration of the transparent plate 10, the air flow provided to the plenum chamber 15, and the conditions of use, different configuration of nozzle 18 may be used in order to provide an effective air curtain.

It should be appreciated that, in the present disclosure, reference is made to the plenum chamber 15 being attached to a top edge of the transparent plate 10 and a bottom edge of the transparent plate 10 existing at the opposite end of the transparent plate 10. Such references to a top edge and a bottom edge should be understood to refer to a particular orientation of a lens protector in which it may, for example, be used and may correspond to a top edge and a bottom edge of an image being captured by a camera used in conjunction with the lens protector.

However, in general, the lens protector of the present disclosure may be used in any orientation. In this context, references to top edge and bottom edge, respectively and corresponding references to upwards and downwards directions, for example, should not be understood to be limiting and may be understood to refer to a first side and a second side of the transparent plate respectively and corresponding directions between the first and second sides.

It should also be understood that although in an arrangement an air curtain is provided, the lens protector of the present disclosure may utilise a gas curtain consisting of another gas.

However, in general, an air curtain may be more convenient because it may avoid the requirement to provide a source of gas because air for the air curtain may be drawn from the ambient environment.

As shown in the arrangement depicted in the figures, the lens protector may be provided with features that may enhance the performance of the air curtain. For example, side walls 21, 22 may be provided along one or both edges of the transparent plate 10. Alternatively or additionally, a top surface may be provided along the top edge of the transparent plate 10. The nozzle 18 may be formed within such a top surface. The top surface may be attached to and/or constituted from a wall of the plenum chamber 15. Such side walls 21, 22 and/or top surface may extend from the edges of the transparent plate 10 in a direction away from the second side, namely the side of the transparent plate 10 across which the air curtain is provided.

The side walls 21, 22 and/or top surface may function to prevent the air curtain from being diminished at the edges of the transparent plate 10. For example, in the absence of the side walls 21, 22 and/or top surface, vortices may form at the edges of the transparent plate 10 and/or slow moving air beyond the edge of the transparent plate 10 may be drawn into the air curtain. Such effects may result in the effective width of the air curtain decreasing with distance from the nozzle 18 used to form the air curtain, namely reducing the width of the air curtain as it travels across the transparent plate 10. Provision of the side walls 21, 22 may reduce these detrimental effects, enabling the air curtain to remain effective over a greater distance from the nozzle 18. The provision of a top surface may minimise the entrainment of static or slow-moving air near the nozzle 18, minimising the growth of the air curtain.

In an arrangement, side walls 21, 22 and/or top surface provided at the edges of the transparent plate 10 may be integrally formed with at least a part of the plenum chamber 15.

In an arrangement, a flap 30 may be provided at the bottom edge of the transparent plate 10, namely at the edge that is furthest from the nozzle 18. The flap 30 may form a surface that includes a first region 31 that is coplanar with the surface of the transparent plate 10 across which the air curtain is provided at the location at which the flap 30 adjoins the transparent plate 10. The surface of the flap 30 may include a second region 32 in which the surface curves away from the side of the transparent plate 10 across which the air curtain is provided.

The provision of the flap 30 may assist in reducing a build-up of contaminants on the lens protector during use. In particular, if the lens protector is used in an environment in which water, for example rain, is present, water can collect at a lower edge of the lens protector where the air curtain is weakest. As the mass of water increases, the surface tension of the water may cause it to spread out with the result that the top edge of the water build-up rises up the transparent plate 10, namely towards the nozzle 18.

Provision of a flap 30 that curves away from the surface of the transparent plate 10 on which the air curtain is provided, may reduce the tendency of a build-up of water to spread upwards. Additionally, the curtain of air provided across the surface of the transparent plate 10 will adhere to the surface by the coanda effect. The coanda effect will also adhere the air curtain to the surface of the flap 30 that curves away from the surface on which the air curtain is provided. As a result, the flap diverts the air flow away from the subject that is being imaged by the camera protected by the lens protector.

In an arrangement, the flap 30 may include side wall sections 33, 34 that extend the benefit of the side walls 21, 22 provided at the edges of the transparent plate 10 discussed above. The flap 30 may also include a plurality of aerodynamic devices such as vortex generators 35, provided on the surface of the flap across which the air curtain flows. The aerodynamic devices may be configured to promote the flow of the air curtain. For example, vortex generators 35 may be elongate features to produce vertical structures in the air flow. In an arrangement they may be are oriented such that their elongate direction is parallel to the air flow of the air curtain. The vortex generators 35 may assist in maintaining the air curtain. For example, the vortex generators 35 may re-energise the airflow, increasing flow speed and promoting better attachment of the airflow to the flap 30.

In an arrangement, the flap 30 may be connected to the transparent plate 10. Alternatively or additionally, the side wall sections 33, 34 of the flap 30 may be connected to the side walls 21, 22 provided at the edges of the transparent plate 10.

In an arrangement, a gutter 40 may be provided to the outside surface of the plenum chamber 15. The gutter 40 may comprise an angled channel arranged such that liquid, such as rain, falling on the outside surface of the plenum chamber 15 collects in the gutter 40 and flows under gravity to, or beyond, the edges of the transparent plate 10. Such an arrangement may prevent rain water falling on the plenum chamber 15 from flowing onto the transparent plate 10 or dripping across the field of view.

The transparent plate 10 may be formed from optically clear glass. It may be, for example, shatterproof glass. The surface finish of the transparent plate 10, in particular on the side across which the air curtain is provided, may affect the performance of the lens protector.

In an arrangement, a hard glass, having relatively few surface imperfections, may be used. Alternatively or additionally, a coating, such as a hydrophobic coating may be applied to at least the surface of the transparent plate across which the air curtain is provided and, optionally, on both sides of the transparent plate 10.

The lens protector may be connected to a suitable air supply or, as explained above, other gas supply. Alternatively, the lens protector may include a fan or compressor to provide a flow of air to the inlet 16 of the plenum chamber 15. In an arrangement a radial blower may be used. The fan may be directly connected to the plenum chamber 15 or may be connected to the plenum chamber by a suitable gas conduit, such as a hose. The hose may be detachably attached to the fan 16 and/or the plenum chamber 15, which may facilitate mounting the system to a camera.

In an arrangement, a fan controller may be provided for controlling the flow rate of air provided to the plenum chamber. Such an arrangement may ensure that a sufficient air supply is provided in order to form an effective air curtain for the conditions in which the lens protector is being used without using an unnecessarily large air supply. In an arrangement the fan controller may be configured to switch the fan between first and second operation modes. For example, a first mode may be configured to provide a higher airflow during use of a camera protected by the lens protector and a second mode may be configured to provide a lower airflow that is sufficient during periods in which a camera is being prepared for use. In this context, it may be appreciated that the fan may be battery powered, in which case reducing demand on the fan may extend the time available between battery changes. In an arrangement, the fan controller may control the operation of the fan.

In an arrangement, the fan may include at least one rotating fan blade, such as an impeller that is used to generate the air flow. In such an arrangement, the fan controller may enable adjustment of the angular frequency of the rotating fan blade. Such an adjustment may be desirable not only at a coarse level to adjust the airflow provided by the fan but also at a finer level in order to tune the fan, for example to avoid problematic frequencies. Problematic frequencies may include frequencies that cause a resonant response of the fan itself, the lens protector or a camera protected by the lens protector. Problematic frequencies may also include frequencies that generate noise that is clearly audible in a sound feed used in conjunction with a camera protected by the lens protector.

In an arrangement, a filter may be provided to remove contaminants from the air used to provide the air curtain across the surface of the transparent plate 10. This may minimise the risk of such contaminants building up on the surface of the glass plate 10 or within the plenum chamber 15 or the nozzle 18. Such contaminants may otherwise also damage the transparent plate 10, for example create scratches, reducing the effectiveness of the lens protector. In an arrangement, at least one filter may be provided at an inlet to a fan used to draw air in from the ambient environment. Use of such a filter may not only prevent contaminants building up on or damaging surfaces of the transparent plate, nozzle and plenum but may also prevent such a build-up of contaminants or damage caused by contaminants within the fan. It should be appreciated that a plurality of filters may be used, for example a relatively coarse filter on an inlet to the fan and a further, finer, filter between the fan and the plenum chamber.

What is claimed is:

1. A protector for an optical component on an imaging device, said protector comprising:
    a frame having a top section, a bottom section, and a first side and a second side at two ends of the frame, and wherein the top section is located above, elevation-wise, the bottom section and wherein the first side has a first frame sidewall and the second side has a second frame sidewall;
    a single transparent plate positioned on the frame between the first frame sidewall and the second frame sidewall;

an elongated body defining a hollow chamber located closer to the top section of the frame than the bottom section of the frame, the hollow chamber being in fluid communication with an elongate nozzle;

a first planar surface on the single transparent plate and a second planar surface on the single transparent plate opposing the first planar surface; and wherein the nozzle is positioned relative to the single transparent plate to direct gas from the hollow chamber through the nozzle and across at least part of the first planar surface of the single transparent plate.

2. The protector of claim 1, wherein the elongated body is a plenum comprising a fan.

3. The protector of claim 1, wherein the elongated body is a plenum and a conduit or hose is connected to the plenum to supply gas to the hollow chamber; and the elongated body extends from the first frame sidewall to the second frame sidewall above, elevation-wise, the single transparent plate.

4. The protector of claim 1, wherein the first frame sidewall and the second frame sidewall are generally parallel to one another.

5. The protector of claim 2, wherein the first frame sidewall comprises an edge extending away from the first planar surface of the single transparent plate.

6. The protector of claim 1, further comprising an imaging device, wherein the imaging device is a camera having an optical lens, and wherein the frame is mounted to the camera and positioned in front of the optical lens of the camera.

7. The protector of claim 1, further comprising a gutter located above the single transparent plate, the gutter having planar surfaces that are angled to one another for directing rain away from the first planar surface of the single transparent plate.

8. The protector of claim 1, wherein the first planar surface of the single transparent plate is arranged to face away from the imaging device when the protector is mounted to the imaging device.

9. The protector of claim 1, wherein the bottom section of the frame has a frame bottom, and wherein the frame bottom extends across a mid-point of the elongated body.

10. The protector of claim 2, further comprising a fan controller for controlling operations of the fan.

11. An optical component protector, said optical component protector comprising:
a frame configured for mounting to an imaging device having an optical component;
an elongated body defining a hollow chamber located at a first end of the frame, which is located above, elevation-wise, a second end of the frame;
a first frame sidewall located at a first side of the frame and a second frame sidewall located at a second side of the frame, the first frame sidewall and the second frame sidewall defining a width of the frame;
a transparent plate mounted between the first frame sidewall and the second frame sidewall of the frame and occupying substantially all of the width of the frame, the transparent plate having a first planar surface and a second planar surface opposing the first planar surface;
a nozzle disposed on a side of the first planar surface of the transparent plate and in fluid communication with the hollow chamber for directing gas from the hollow chamber across at least part of the transparent plate; and
wherein the transparent plate is secured to the frame by a retaining clamp and the transparent plate is removable from the frame.

12. The optical component of claim 11, further comprising a fan coupled to the elongated body for directing gas from the hollow chamber across at least part of the transparent plate.

13. The optical component of claim 12, wherein the elongated body is made from at least two sections that are held together by screws or bolts.

14. The optical component of claim 12, wherein the fan is variable by a controller to operate between at least two different operating modes.

15. The optical component of claim 14, further comprising a gutter located above the transparent plate for directing rain away from the first planar surface of the transparent plate.

16. A protector for an optical component on an imaging device, said protector comprising:
a frame having a top section, a bottom section, a first side having a first frame sidewall, and a second side having a second frame sidewall, and wherein the top section is located above, elevation-wise, the bottom section;
a transparent plate removably secured to the frame, the transparent plate having a first planar surface and a second planar surface opposing the first planar surface;
an elongated body defining a hollow chamber secured to the frame, the hollow chamber being in fluid communication with a nozzle having a passage for directing gas from the hollow chamber out the nozzle and across at least part of the first planar surface of the transparent plate; and
a fan attached to the elongated body for expelling air out of the nozzle.

17. The protector of claim 16, wherein the fan has a rotating fan blade and is located at an end of the elongated body.

18. The protector of claim 17, wherein the bottom section of the frame has a frame bottom, and wherein the frame bottom extends across a mid-point of the elongated body.

19. The protector of claim 18, wherein the transparent plate is secured to the frame by a retaining clamp.

20. The protector of claim 19, wherein the first frame sidewall and the second frame sidewall are generally parallel to one another.

21. A protector for an optical component on an imaging device, said protector comprising:
a frame having a top section, a bottom section, a first side having a first frame sidewall, and a second side having a second frame sidewall, and wherein the top section is located above, elevation-wise, the bottom section and the first and second frame sidewalls are generally parallel to one another;
an elongated body defining a hollow chamber located closer to the top section of the frame than the bottom section of the frame, and wherein elongated body extends from the first side to the second side of the frame and the hollow chamber is in fluid communication with a nozzle;
a fan or an air supply source is connected to the elongated body for directing air out of the nozzle;
a single transparent plate removably attached to the frame by a retaining clamp, the single transparent plate having a first planar surface and a second planar surface opposing the first planar surface; and
wherein the bottom section of the frame has a frame bottom, and wherein the frame bottom extends across a mid-point of the single transparent plate and the elongated body.

22. The protector of claim 21, wherein the elongated body is made from at least two sections that are held together by screws or bolts.

23. The protector of claim 22, wherein the fan is located at an end of the elongated body.

24. The protector of claim 23, wherein the single transparent plate is made from shatterproof glass.

25. The protector of claim 24, further comprising a fan controller for controlling operations of the fan.

26. The protector of claim 21, wherein the elongated body is located above a gutter, and wherein the gutter is configured to direct rain away from the single transparent plate.

27. The protector of claim 23, wherein the fan is battery operated.

28. The protector of claim 23, wherein the fan is variable between a first mode having a first flow and a second mode having a second flow that differs from the first flow.

29. The protector of claim 21, wherein the first frame sidewall and the second frame sidewall define a width of the frame and wherein the single transparent plate occupies substantially all of the width of the frame.

30. The protector of claim 21, further comprising a hydrophobic coating applied to the single transparent plate.

* * * * *

UNITED STATES PATENT AND TRADEMARK OFFICE
CERTIFICATE OF CORRECTION

PATENT NO. : 11,747,615 B2
APPLICATION NO. : 18/116223
DATED : September 5, 2023
INVENTOR(S) : Andrew Subratie et al.

It is certified that error appears in the above-identified patent and that said Letters Patent is hereby corrected as shown below:

On the Title Page

Item (12), delete "Subratie" and insert --Subratie et al.--.

Item (72) Inventors, should read:
--(72) Inventors: Andrew Subratie, Surrey (GB); Alberto Llopis-Pascual, Balearic Islands (ES); Peter Hoare, Fleet Hampshire (GB)--.

Signed and Sealed this
Ninth Day of January, 2024

Katherine Kelly Vidal
*Director of the United States Patent and Trademark Office*